(12) United States Patent
Huehn et al.

(10) Patent No.: US 7,658,842 B2
(45) Date of Patent: Feb. 9, 2010

(54) FILTER CARTRIDGE ASSEMBLY WITH WATER COLLECTION

(75) Inventors: Donald Barry Huehn, Blacksburg, VA (US); Joseph Roark, Blacksburg, VA (US); Jeffrey Warden, Raleigh, NC (US)

(73) Assignee: Tetra Holding (US), Inc., Blacksburg, VA (US)

( * ) Notice: Subject to any disclaimer, the term of this patent is extended or adjusted under 35 U.S.C. 154(b) by 191 days.

(21) Appl. No.: 11/893,383

(22) Filed: Aug. 15, 2007

(65) Prior Publication Data

US 2009/0045114 A1 Feb. 19, 2009

(51) Int. Cl.
*A01K 63/04* (2006.01)
(52) U.S. Cl. ............... 210/167.22; 210/167.27; 210/232; 210/238; 210/416.2; 119/260
(58) Field of Classification Search ............ 210/167.21, 210/167.22, 167.25, 167.27, 232, 238, 416.2; 119/259, 260
See application file for complete search history.

(56) References Cited

U.S. PATENT DOCUMENTS

| | | | |
|---|---|---|---|
| 3,469,700 A | * | 9/1969 | Johnson ................. 210/238 |
| 3,513,978 A | | 5/1970 | Newsteder |
| 4,459,209 A | * | 7/1984 | Broadwater ............ 210/167.16 |
| 4,460,462 A | * | 7/1984 | Arneson ................. 210/163 |
| 4,783,258 A | | 11/1988 | Willinger et al. |
| 5,053,125 A | | 10/1991 | Willinger et al. |
| D353,649 S | | 12/1994 | Willinger et al. |
| 6,106,709 A | | 8/2000 | Bresolin |
| 6,692,637 B2 | | 2/2004 | Fox et al. |

FOREIGN PATENT DOCUMENTS

WO WO 2006/034275 A1 3/2006

OTHER PUBLICATIONS

Exhibit A, Huehn et al., U.S. Appl. No. 11/645,225; "Filter Cartridge"; 24 pgs.; filed Dec. 22, 2006.
Exhibit B, *Renaissance* Bravo 120/200/300 Power Filter System; Instructions & Warrranty; 6 pgs. ; dated Oct. 1997.
Exhibit C, IMAGINE® Bio 3 Disposable Filter Cartridges; 3 pgs. Date: Admitted Prior Art.

* cited by examiner

*Primary Examiner*—Fred Prince
(74) *Attorney, Agent, or Firm*—Merchant & Gould P.C.

(57) ABSTRACT

A filter cartridge assembly including a carrier and a filter element. The carrier including a water collection cup that collects water from the filter element when the filter cartridge assembly is held in an inverted orientation.

23 Claims, 8 Drawing Sheets

FILTER CARTRIDGE ASSEMBLY WITH WATER COLLECTION

FIELD OF THE INVENTION

The present disclosure relates generally to devices for use in the aquatics industry, and various methods associated with such devices. More particularly, this disclosure relates to a filter cartridge assembly for use in filtering aquarium water.

BACKGROUND OF THE INVENTION

To maintain an ecological balance within an aquarium, it is necessary to clean the aquarium water. Cleaning is often accomplished by filtering the aquarium water through a filter housing. In the filter housing, water enters a filter chamber, flows through a filter element, and is then returned to the aquarium. Through normal filtering operation, various particulates become trapped in the filter element, requiring the user to regularly service (i.e., maintain and/or replace) the filter element.

As can be understood, the filter element is at least partly submerged within aquarium water during use and is therefore water saturated. When the filter element is serviced, the user typically extracts the filter element from the housing and holds the element over the housing or aquarium to drain. While a majority of the water may drain out of the element, typically residual water remains. The filter element is then transported to a refuse container or sink area for disposal/maintenance. During transport, the user must contend with water drips from the filter element. A common complaint is that this service procedure is messy, as it is impractical to wait until all residual water has drained from the filter element.

In general, improvement has been sought with respect to such filter devices and arrangements, generally to accommodate ease-of-use and convenience for the user.

SUMMARY OF THE INVENTION

The present disclosure relates to a filter cartridge assembly including a carrier and a filter element. The carrier is designed to collect water from the filter element as a user transports the filter cartridge assembly to a sink or refuse container. The carrier also includes a handle and hinged connection arrangement that allows a user to dispose of a used filter element without having to directly handle the filter element.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
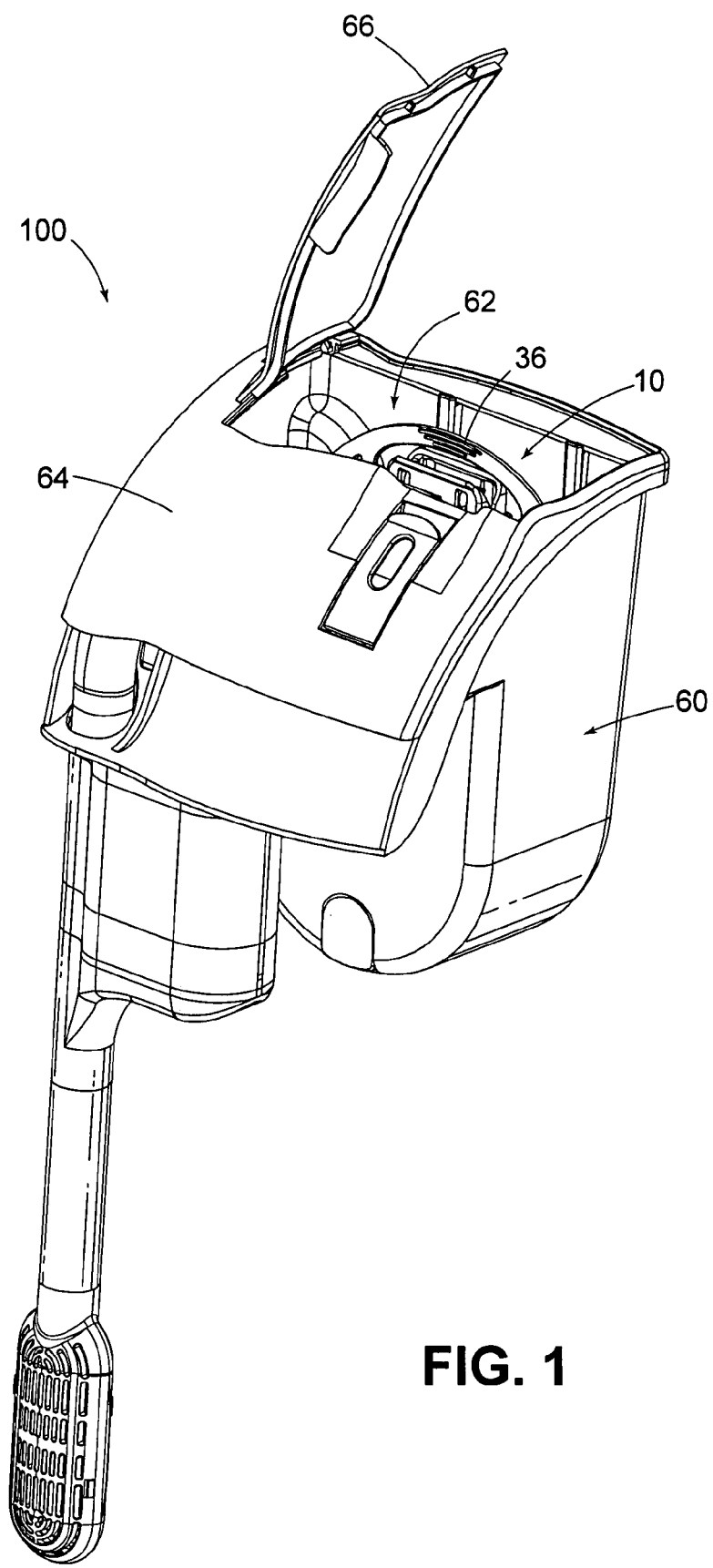
FIG. 1 is front perspective view of an aquarium filter including a filter cartridge assembly, in accordance with the principles disclosed.
Figure 2:
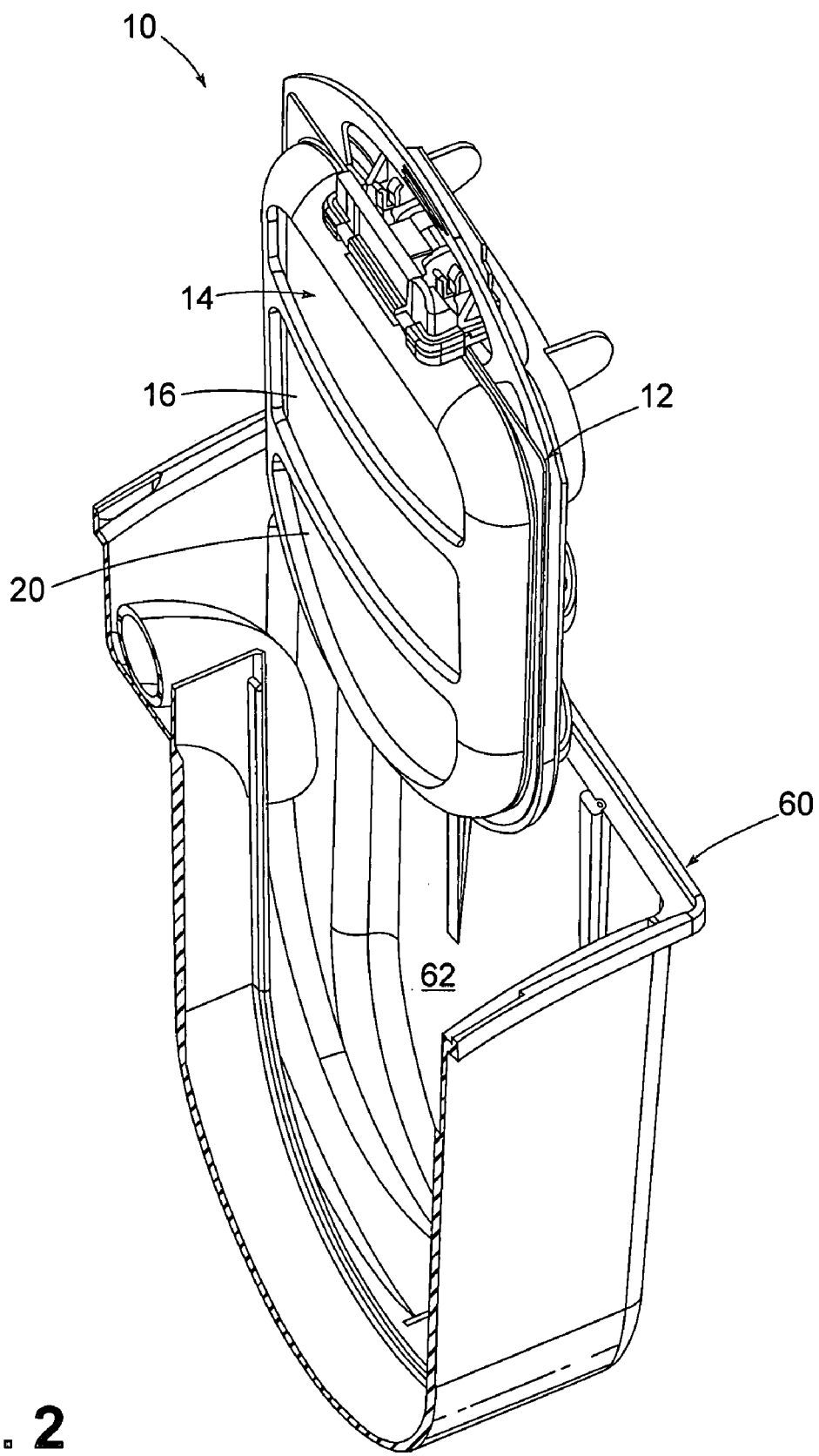
FIG. 2 is a top perspective view of a filter housing and the filter cartridge assembly of the aquarium filter of FIG. 1, the filter housing illustrated without a front wall portion.
Figure 3:
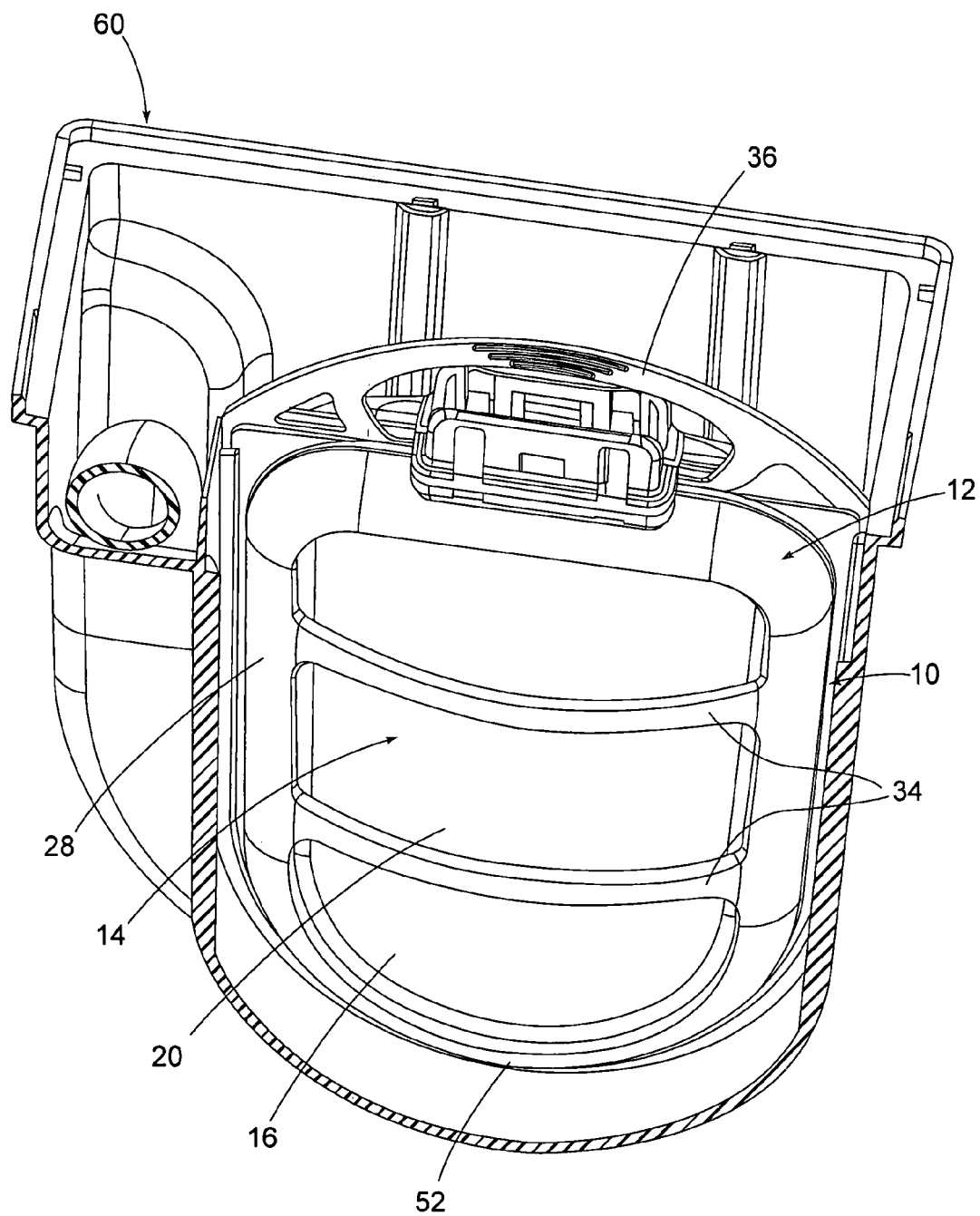
FIG. 3 is another top perspective view of the filter housing and filter cartridge assembly of FIG. 2.

FIGS. 1-3 illustrate an aquarium filter 100 (FIG. 1) having a filter cartridge assembly 10 (FIGS. 2 and 3) in accordance with the principles disclosed. The disclosed filter cartridge assembly 10 is designed for use in an aquarium filter (e.g. aquarium filter 100). Details of example aquarium filters that can utilize the present filter cartridge assembly 10 are described in U.S. application Ser. Nos. 11/893,392 and 11/893,367; which applications are incorporated herein by reference. Features of the present filter cartridge assembly 10, however, can be used in other water filter applications, such as in pond filter applications, for example.

As will be described in greater detail hereinafter, the present filter cartridge assembly 10 is designed to minimize the mess and inconvenience associated with servicing filter elements. In particular, in one aspect, the disclosed filter cartridge assembly minimizes the concern of water dripping from the filter element when the filter cartridge assembly is transported to a refuse container or sink for disposal and/or maintenance.

Referring to FIG. 1, the aquarium filter 100 includes a filter housing 60 that defines an interior filtering chamber 62. During filtration, the filter cartridge assembly 10 is located within the interior filtering chamber 62 (see also FIGS. 2 and 3). A filter cover 64 can be positioned over the interior filtering chamber 62 to enclose the filter cartridge assembly 10 within the housing 60. In the illustrated embodiment, the cover 64 includes a door 66 that provides access to the filter cartridge assembly 10. The filter cartridge assembly 10 can be removed from and inserted into the interior filtering chamber 62 through the door 66.

Referring now to FIGS. 2 and 3, the filter cartridge assembly 10 of the present disclosure generally includes a carrier 12 (e.g., a cartridge carrier or a filter carrier) and a filter element 14 (e.g., filter media or filter cartridge) secured in relation to the carrier 12. In the illustrated embodiment, the filter element 14 includes a filtering body 16 defined by first and second porous filter walls 18, 20 (schematically represented in FIG. 4). The first and second porous filter walls 18, 20 can be of the same material and density; or made of different materials and/or densities. Further details of filter elements having different wall materials/densities that can be incorporated in the present filter cartridge assembly are described in U.S. Pat. No. 6,692,637 and U.S. application Ser. No. 11/893,385; which patent and application are incorporated herein by reference.

Figure 5:
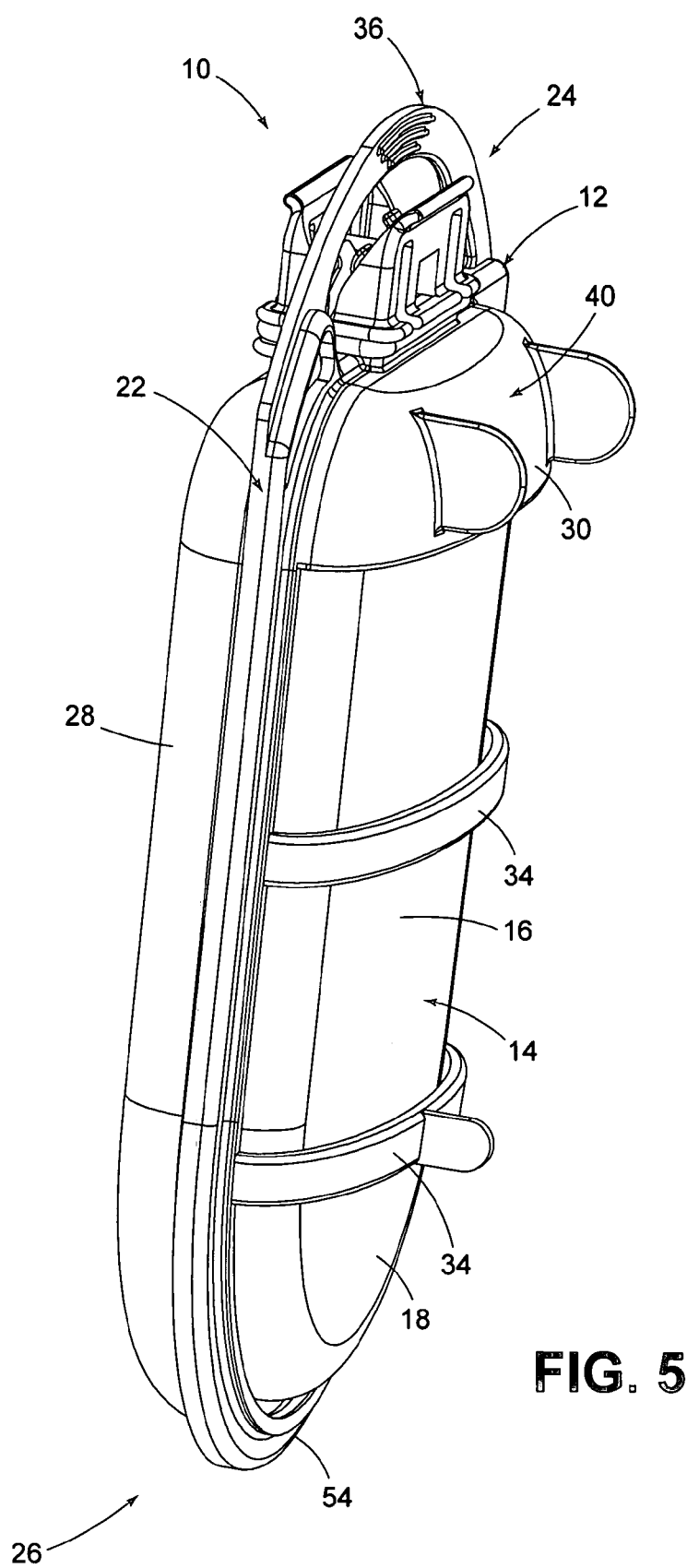
FIG. 5 is a rear perspective view of the filter cartridge assembly of FIG. 2.

Referring to FIG. 5, the carrier 12 of the present assembly 10 includes a support frame 22 having a first end 24 and an opposite second end 26. A handle 36 is located adjacent to the first end 24 of the support frame 22. The handle 36 is used to maneuver the filter cartridge assembly 10 when installing or removing the assembly 10 from the aquarium filter 100. The handle 36 can also be used to carry or transport the filter cartridge assembly 10 to a disposal container or sink for service.

Figure 4:
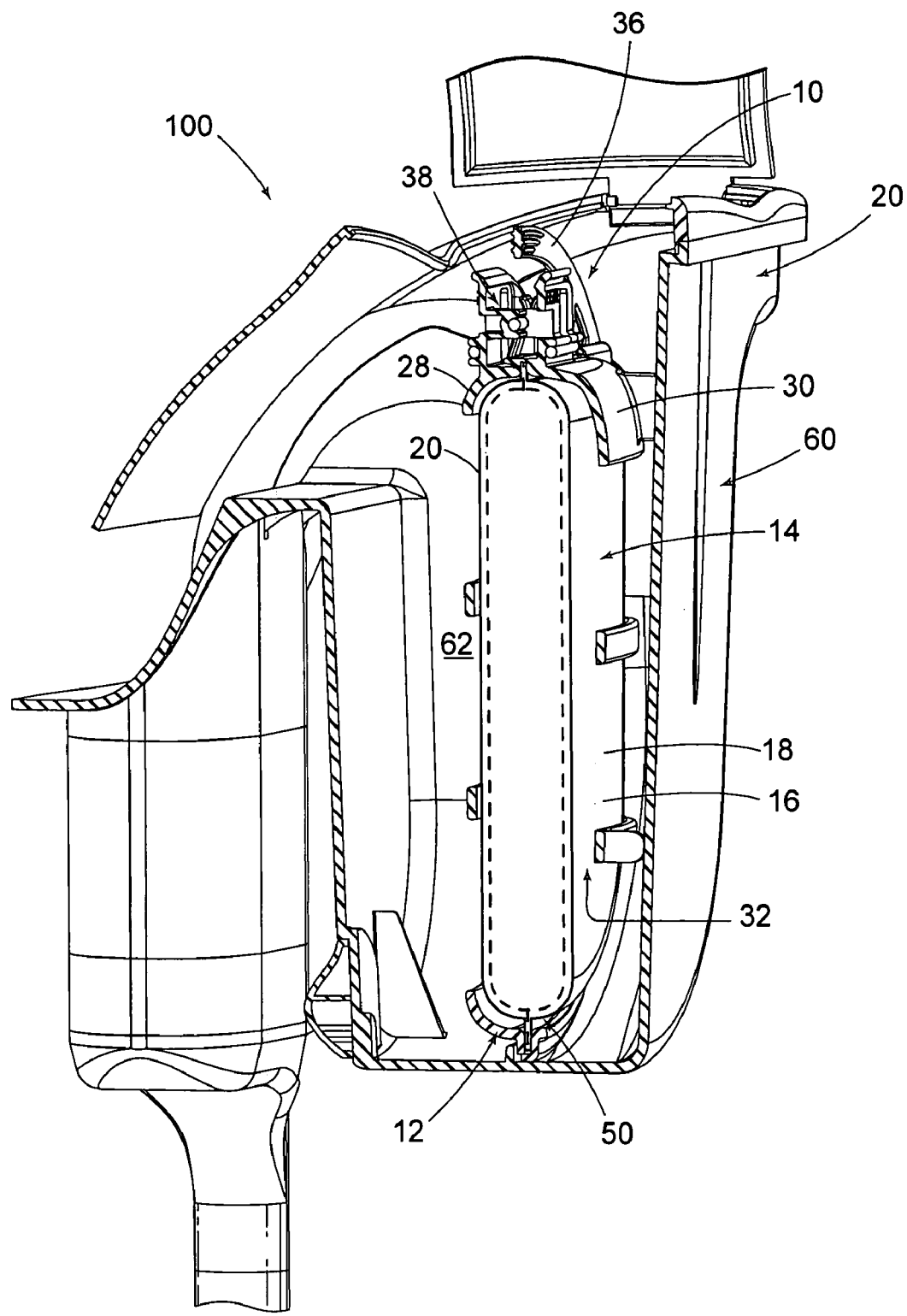
FIG. 4 is a cross-sectional perspective view of the aquarium filter of FIG. 1.
Figure 6:
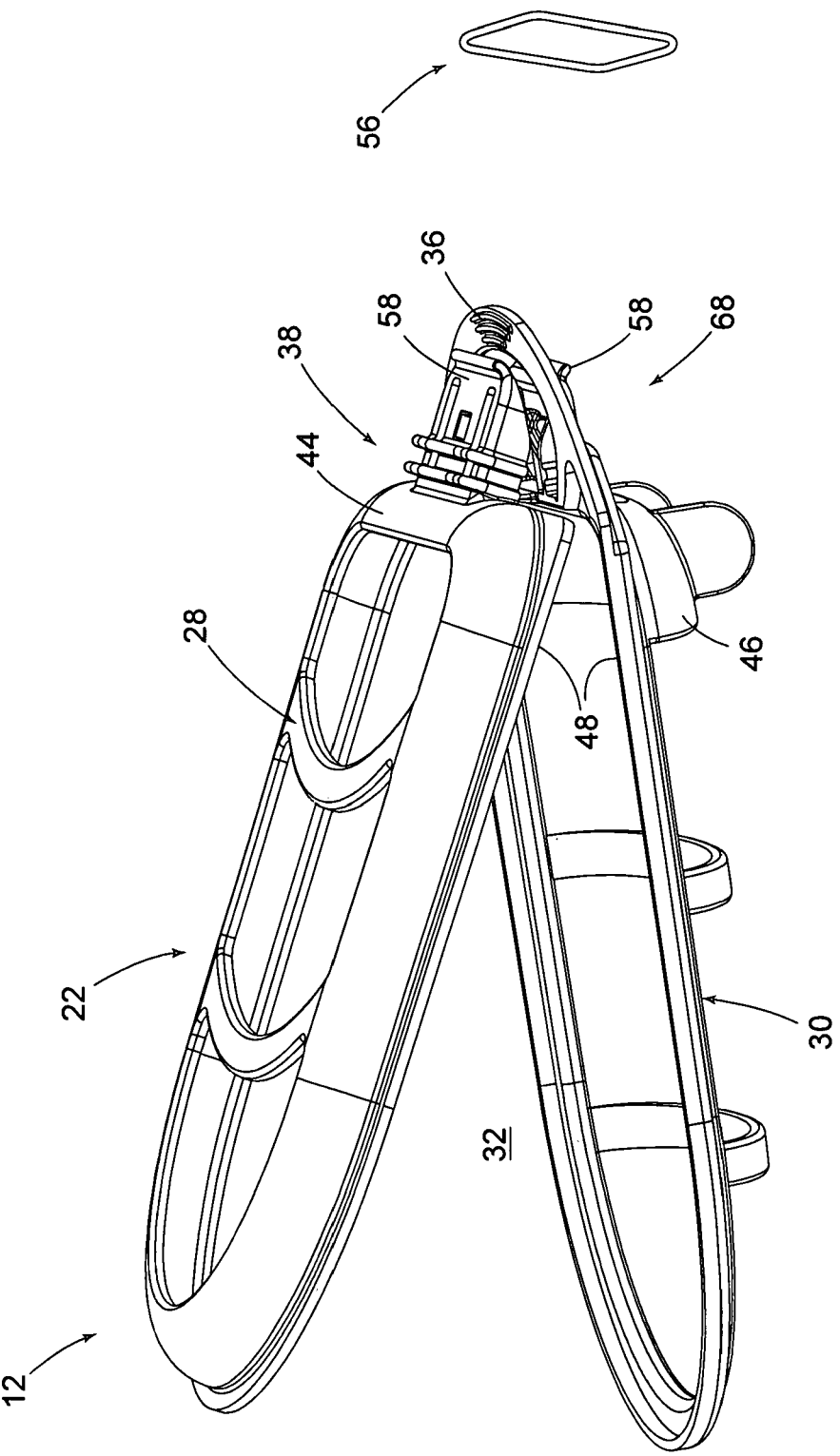
FIG. 6 is a side perspective view of a carrier of the filter cartridge assembly of FIG. 5, shown in isolation.

Referring now to FIGS. 4-6, the support frame 22 of the carrier 12 includes a first front frame member 28 and a second rear frame member 30. The first and second frame members 28, 30 define a carrier interior 32. The handle 36 of the filter cartridge assembly 10 is an integral construction of the second rear frame member 30 of the support frame 22 (see FIG. 8).

Figure 7:
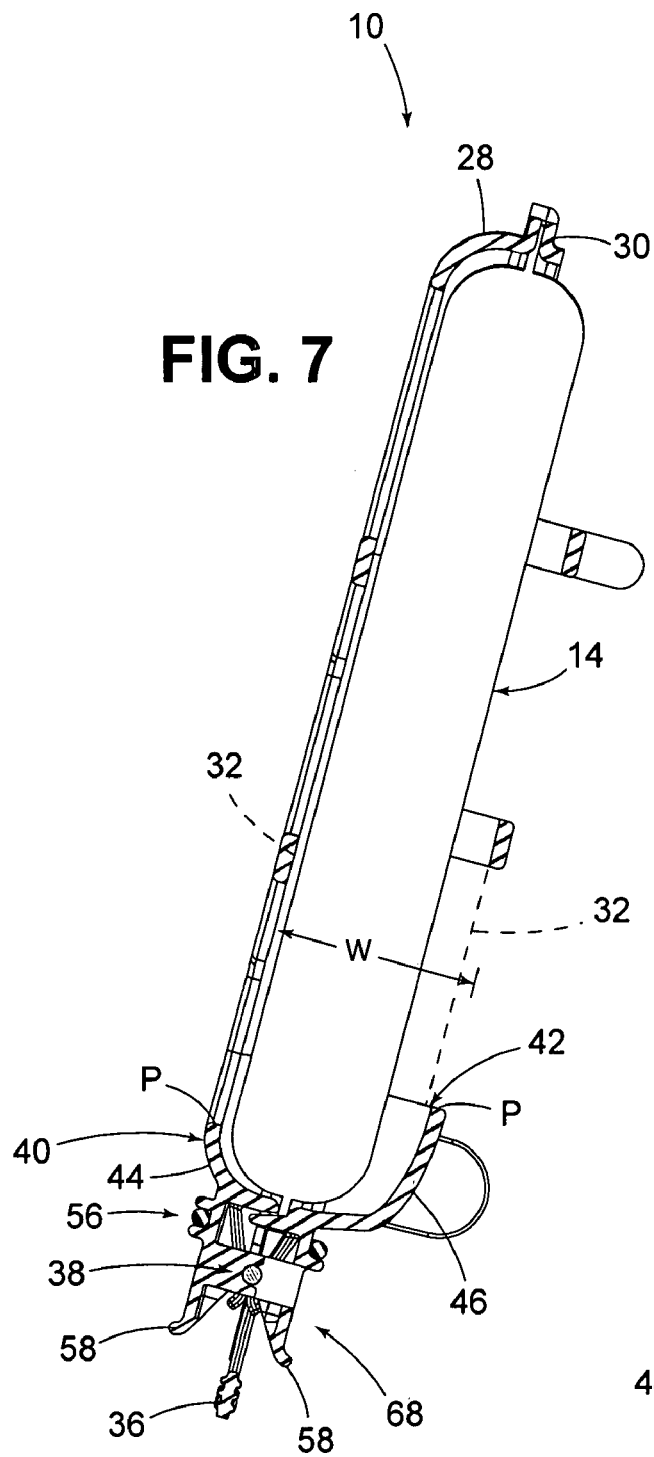
FIG. 7 is a cross-sectional, side elevation view of the filter cartridge assembly of FIG. 5, the filter cartridge assembly illustrated in an inverted orientation.

In the illustrated embodiment, the first and second frame members 28, 30 are attached to one another at a hinged connection 38. By way of the hinged connection 38, the frame members 28, 30 are positionable in open and closed positions relative to one another (i.e., the members 28, 30 pivot or hinge about the hinged connection 38). In the open position (FIG. 6), the carrier interior 32 is accessible for removing or inserting the filter element 14. In the closed position (FIGS. 4 and 5), the filter element 14 is contained within the carrier interior 32. The hinged connection 38 of the carrier 12 is defined by a single clip 68 (FIG. 7). The single clip 68 has a biasing arrangement 56 that urges or biases the frame members 28, 30 toward the closed position to secure the filter element 14 within the carrier interior 32. Transverse cross supports 34 (FIGS. 3 and 5) of the first and second frame members 28, 30 can be provided to further retain the filter element 14 within the interior 32 of the carrier 12.

Referring to FIGS. 3 and 5, in the illustrated embodiment, the first and second opposing frame members 28, 30 of the support frame 22 have rounded bottom edges 52, 54 that correspond to a rounded bottom edge 50 (FIG. 4) of the filter element 14. Details of filter elements having a rounded bottom construction, as well as other bottom constructions that can be employed in the present filter element, are described in U.S. application Ser Nos. 11/645,225 and 11/893,385; which applications are incorporated herein by reference.

One of the features of the present filter cartridge assembly 10 is the ease and convenience associated with servicing (i.e., maintaining and/or replacing) the filter element 14 of the filter cartridge assembly 10. As previously described, when servicing conventional filter elements, the filter elements are first drained but typically retain some amount of water. The user is then required to contend with the transportation of a wet filter element, which usually results in a trail of water drips along the floor.

Referring to FIG. 5, the carrier 12 of the present filter cartridge assembly 10 includes a water collection cup 40 (e.g., a trough, channel, or collection structure). The water collection cup 40 is located adjacent to the handle 36 of the carrier 12 and eliminates the concern for trailing water drops along the floor during filter element servicing.

In particular, during service, the user extracts the filter element 14 from the filter housing 60 and inverts the support frame 22 and filter element 14 to an orientation at which the support frame and filter element are located generally above the handle 36 (e.g., an inverted vertical orientation or a sufficiently inverted angled orientation at which water runs into the cup 40). When the filter cartridge assembly 10 is inverted, as illustrated in FIG. 7, the cup 40 has an upward opening 42 that collects water from the filter element 14. As the inverted filter cartridge assembly 10 is transported, water from the filter element 14 accumulates in the cup 40 as opposed to dripping along the floor. The water collection cup 40 defines a volume sized to collect a particular amount of water that may drain from the inverted filter element 14. In the illustrated embodiment, the water collection cup holds up to a total of about 0.7 ounces of water; more specifically between about 0.05 ounces and about 0.7 ounces, depending upon the orientation at which the collection cup is held.

Figure 9:
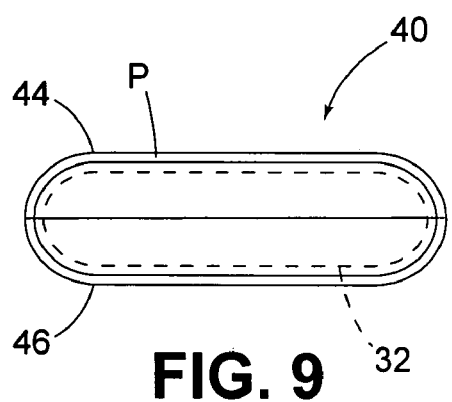
FIG. 9 is a schematic top plan view of a portion of the carrier of FIG. 7.
Figure 8:
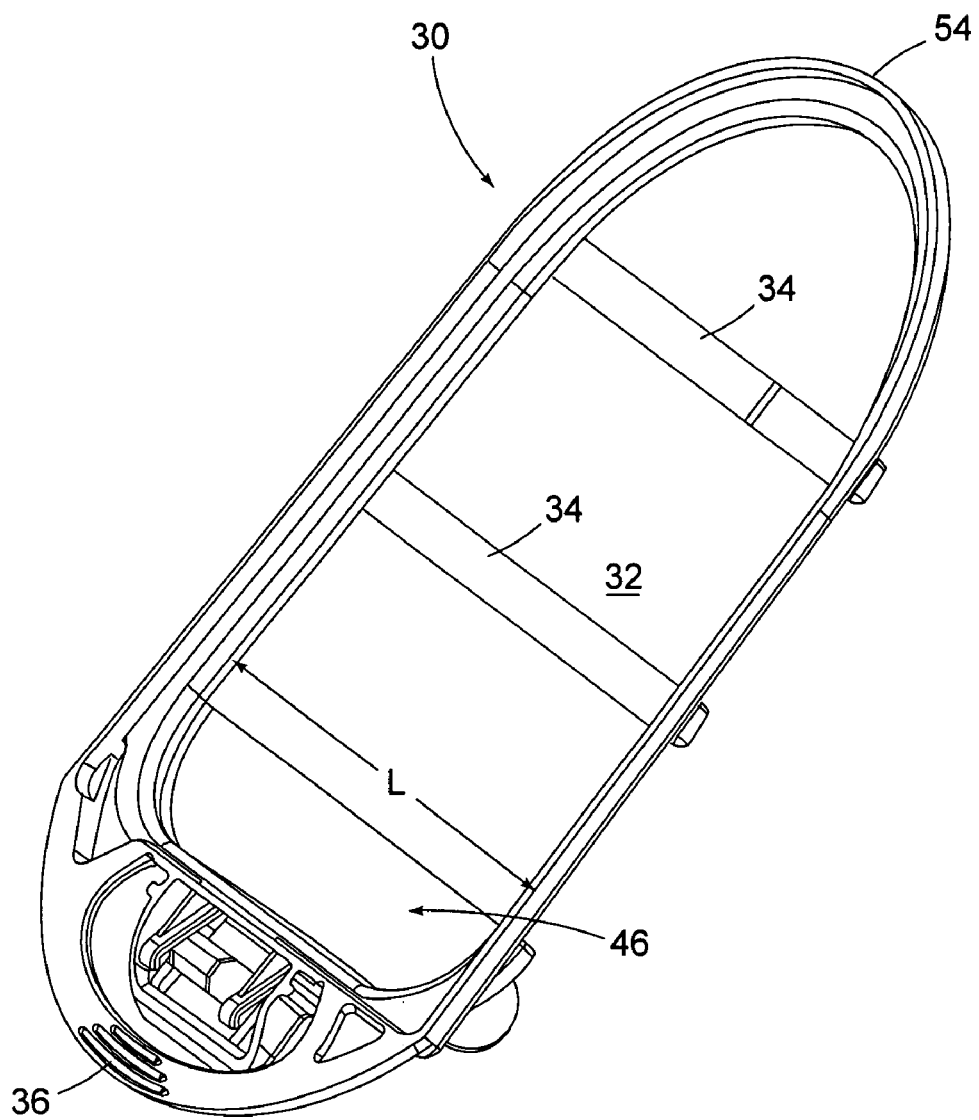
FIG. 8 is a perspective view of one frame member of the carrier of FIGS. 6 and 7, shown in isolation.

Referring to FIGS. 7 and 9, the upward opening 42 of the cup 40 defines a cup perimeter P. The perimeter P circumscribes the cross-sectional area of both the carrier interior (see dashed lines 32) of the support frame 22 and filter element 14 when in the inverted orientation. In particular, the perimeter defines an opening width W (FIG. 7) and an opening length L (FIG. 8). The width W and length L are generally greater than the width and length of the cross-sectional area of the carrier interior 32 and the filter element 14 so that water draining from the inverted filter element collects within the cup 40.

Referring again to FIGS. 6 and 7, the collection cup 40 is located above the hinged connection 38 of the support frame 22 when the support frame 22 and filter element 14 are in the inverted orientation. To accommodate the opening and closing of the support frame 22, the cup 40 is defined by first and second cup portions 44, 46. The first cup portion 44 is carried by the first frame member 28 and the second cup portion 46 (see also FIG. 8) is carried by the second frame member 30. In the illustrated embodiment, the heights of the first and second cup portions 44, 46 are not the same for aesthetic purposes. In an alternative embodiment, the frame members 28, 30 and the cup portions 44, 46 can be constructed so that the heights of the cup portions are generally equal.

Referring still to FIGS. 6 and 7, when the first and second frame members 28, 30 are in the open position (FIG. 6), the first and second cup portions 44, 46 are spaced apart to accommodate the placement or removal of the filter element 14. When the first and second frame members 28, 30 are in the closed position (FIG. 7), the first and second cup portions 44, 46 seat and/or seal together to define the water collection cup 40. In one embodiment, a separate sealing element can be positioned between the cup portions to provide a water-tight seal. In the illustrated embodiment, edges 48 of the cup portions 44, 46 are constructed to create a simple labyrinth-type seal that retains water within the water collection cup 40. The biasing arrangement 56 (e.g., an elastic ring or band member) of the filter cartridge assembly urges the labyrinth-type edges 48 of the cup portions 44, 46 into sealing engagement.

As previously described, the water collection cup holds a total of up to about 0.7 ounces of water; each portion 44, 46 being capable of holding part of the total amount of water. In the illustrated embodiment, the water collection cup 40 holds more water (up to about 0.40 to 0.45 ounces) between the second cup portion 46 and a planar mid-section of the filter element 14 than that between the first cup portion 44 and the filter element.

In addition to eliminating the dripping mess of filter element service, the present filter cartridge assembly 10 further eases the disposal and replacement of a used filter element. Referring back to FIG. 6, the hinged connection 38 of the present filter cartridge assembly 10 is defined by the clip 68. The clip 68 is located adjacent to the handle 36 of the carrier 12. The handle 36 is used to maneuver and transport the filter cartridge assembly 10, while the clip 68 is used to open and close the first and second frame members 28, 30 of the support frame 22. To access the carrier interior 32, the user simply squeezes the clip (i.e., tabs 58 of the clip 68) located adjacent to the handle 36 to open the support frame 22. After accessing the carrier interior 32, for removal or insertion of the filter element, for example, the user releases the clip 68 and the support frame 22 closes.

The arrangement of the handle 36 and clip 68 is particularly useful in disposing of a used filter element. That is, the carrier 12 permits a user to dispose of a used filter element without having to touch or directly handle the used filter element. A user need only grasp the handle 36 to remove the filter cartridge assembly 10 from the filter housing 60, transport the filter cartridge assembly 10 to a disposal container by the handle, and then squeeze the clip 68 to open the support frame 22. When open, the used filter element is free to fall or drop out of the carrier interior 32. The clip 68 thereby permits a user to release and dispose of a used filter element without having to touch the filter element. Further, the present carrier 12 is convenient and easy to operate. The handle 36 and clip 68 require only one hand to maneuver and open/close the support frame; leaving the other hand free to open a cover of a disposal container, or place a new filter element in the carrier interior, for example.

In general, the present filter cartridge assembly improves upon conventional cartridge assemblies by providing a water retention or collection cup when the filter cartridge assembly is inverted. The present filter cartridge assembly further permits a user to easily dispose of a used filter element by simply squeezing the clip of the carrier to release the filter element from the carrier interior.

The above specification provides a complete description of the present invention. Since many embodiments of the invention can be made without departing from the spirit and scope of the invention, certain aspects of the invention reside in the claims hereinafter appended.

What is claimed is:

1. A filter cartridge assembly, comprising:
    a) a support frame having a first end and a second end, the support frame including first and second opposing frame members that are attached to one another at one of the first and second ends of the support frame;
    b) filter media secured relative to the support frame;
    c) a handle located at the first end of the support frame; and
    d) a water collection cup located adjacent to the handle, the water collection cup having a perimeter that circumscribes the filter media;
    e) wherein water from the filter media collects within the water collection cup when the support frame and filter media are held in an inverted orientation above the handle;
    f) wherein the first and second opposing frame members remain attached to one another during replacement of the filter media.

2. The filter cartridge assembly of claim 1, wherein the cup has an upward opening when the support frame and filter media are held in the inverted orientation.

3. The filter cartridge assembly of claim 1, wherein the first and second opposing frame members define a carrier interior in which the filter media is placed.

4. The filter cartridge assembly of claim 3, wherein the opposing frame members include transverse cross supports for retaining the filter media within the carrier interior.

5. The filter cartridge assembly of claim 3, wherein the first and second opposing frame members are positionable in open and closed positions relative to one another, the first and second opposing frame members providing access to the carrier interior when in the open position.

6. The filter cartridge assembly of claim 5, wherein the first and second opposing frame members are attached to one another at a hinged connection.

7. The filter cartridge assembly of claim 6, further including a clip, the clip defining the hinged connection, wherein the first and second frame members move between the open and closed positions by squeezing and releasing the clip.

8. The filter cartridge assembly of claim 6, wherein the water collection cup is located above the hinged connection when the support frame and filter media are held in the inverted orientation.

9. The filter cartridge assembly of claim 3, wherein the water collection cup is defined by first and second cup portions carried by the first and second opposing frame members.

10. The filter cartridge assembly of claim 1, wherein the water collection cup defines a volume, the volume being sized to hold up to about 0.7 ounces of water.

11. A filter cartridge carrier, comprising:
    a) a support frame having a first end and a second end, the support frame including first and second frame members that define a carrier interior, the first and second frame members being attached to one another at one of the first and second ends of the support frame, the first and second frame members being positionable in an open position to provide selective access to the carrier interior and positionable in a closed position, the first and second frame members remaining attached to one another during access to the carrier interior;
    b) a handle located at the first end of the support frame; and
    c) a water collection cup located adjacent to the handle, the water collection cup having a perimeter that circumscribes a cross-sectional area of the carrier interior.

12. The cartridge carrier of claim 11, wherein the cup has an upward opening for the collection of water when the support frame is held in an inverted orientation above the handle.

13. The cartridge carrier of claim 11, wherein the water collection cup defines a volume, the volume being sized to hold up to about 0.7 ounces of water.

14. The cartridge carrier of claim 11, wherein the water collection cup is defined by first and second cup portions carried by the first and second frame members, respectively.

15. The cartridge carrier of claim 11, wherein the frame members are adapted to receive filter media when in the open position and retain the filter media within the carrier interior when in the closed position.

16. The cartridge carrier of claim 15, wherein the first and second frame members include transverse cross supports for retaining the filter media placed within the carrier interior.

17. The cartridge carrier of claim 15, wherein the first and second frame members are attached to one another at a hinged connection.

18. The cartridge carrier of claim 17, further including a clip, the clip defining the hinged connection, wherein the first and second frame members move between the open and closed positions by squeezing and releasing the clip.

19. The cartridge carrier of claim 17, wherein the water collection cup is located above the hinged connection when the support frame is held in an inverted orientation.

20. A filter cartridge assembly, comprising:
    a) a support frame having a first end and a second end, the support frame including first and second opposing frame members;
    b) a clip that defines a hinged connection between the first and second opposing frame members, wherein the first and second frame members move between open and closed positions by squeezing and releasing the clip;
    c) filter media secured relative to the support frame;
    d) a handle located at the first end of the support frame; and
    e) a water collection cup located adjacent to the handle, the water collection cup having a perimeter that circumscribes the filter media, wherein water from the filter media collects within the water collection cup when the support frame and filter media are held in an inverted orientation above the handle.

21. A filter cartridge assembly, comprising:
a) a support frame having a first end and a second end, the support frame including first and second opposing frame members attached to one another at a hinged connection;
b) filter media secured relative to the support frame;
c) a handle located at the first end of the support frame; and
d) a water collection cup located adjacent to the handle, the water collection cup having a perimeter that circumscribes the filter media, wherein water from the filter media collects within the water collection cup when the support frame and filter media are held in an inverted orientation above the handle, wherein the water collection cup is located above the hinged connection when the support frame and the filter media are held in the inverted orientation.

22. A filter cartridge carrier, comprising:
a) a support frame having a first end and a second end, the support frame including first and second frame members that define a carrier interior;
b) a clip that defines a hinged connection between the first and second opposing frame members, wherein the first and second frame members move between open and closed positions by squeezing and releasing the clip;
c) a handle located at the first end of the support frame; and
d) a water collection cup located adjacent to the handle, the water collection cup having a perimeter that circumscribes a cross-sectional area of the carrier interior.

23. A filter cartridge carrier, comprising:
a) a support frame having a first end and a second end, the support frame including first and second frame members that define a carrier interior, the first and second frame members being attached to one another at a hinged connection;
b) a handle located at the first end of the support frame; and
c) a water collection cup located adjacent to the handle, the water collection cup having a perimeter that circumscribes a cross-sectional area of the carrier interior, the water collection cup being located above the hinged connection when the support frame is held in an inverted orientation.

* * * * *